(12) United States Patent
Moore

(10) Patent No.: US 7,797,169 B2
(45) Date of Patent: Sep. 14, 2010

(54) METHOD OF FACILITATE OBTAINING, STORING, AND SUBSEQUENTLY CONVEYING INFORMATION BETWEEN RELATED GENERATIONS

(76) Inventor: Barrett H. Moore, 1001 Green Bay Rd., #312, Winnetka, IL (US) 60093

( * ) Notice: Subject to any disclaimer, the term of this patent is extended or adjusted under 35 U.S.C. 154(b) by 1006 days.

(21) Appl. No.: 11/549,527

(22) Filed: Oct. 13, 2006

(65) Prior Publication Data
US 2008/0091444 A1    Apr. 17, 2008

(51) Int. Cl.
*G06Q 99/00* (2006.01)
(52) U.S. Cl. .......................................... 705/1.1; 705/319
(58) Field of Classification Search ................. 705/1.1, 705/319
See application file for complete search history.

(56) References Cited
U.S. PATENT DOCUMENTS

2002/0032687 A1*  3/2002  Huff .......................... 707/104.1
2004/0072129 A1*  4/2004  Arnoldy ....................... 434/154
2005/0015710 A1*  1/2005  Williams ...................... 715/500
2009/0287685 A1* 11/2009  Charnock et al. ................ 707/5

* cited by examiner

*Primary Examiner*—Jonathan Ouellette
(74) *Attorney, Agent, or Firm*—Fitch, Even, Tabin & Flannery

(57) ABSTRACT

A party (such as a private entity) obtains (101) information from a plurality of unrelated individuals. This party then identifies (104) candidate information recipients as a function of ancestral relationships to the unrelated individuals and also provides for non-volatily storing (105) the information under conditions designed to preserve the informational integrity of the information for multiple generations. These teachings also provide for maintaining (107) such information in confidence. This entity then provides (111) the information as corresponds to a given one of the plurality of unrelated individuals to respective descendants of the given one who are candidate information recipients. So configured, successive generations of the descendants will have sequential access to the information as corresponds to their respective ancestors while the information remains unrevealed to others.

58 Claims, 1 Drawing Sheet

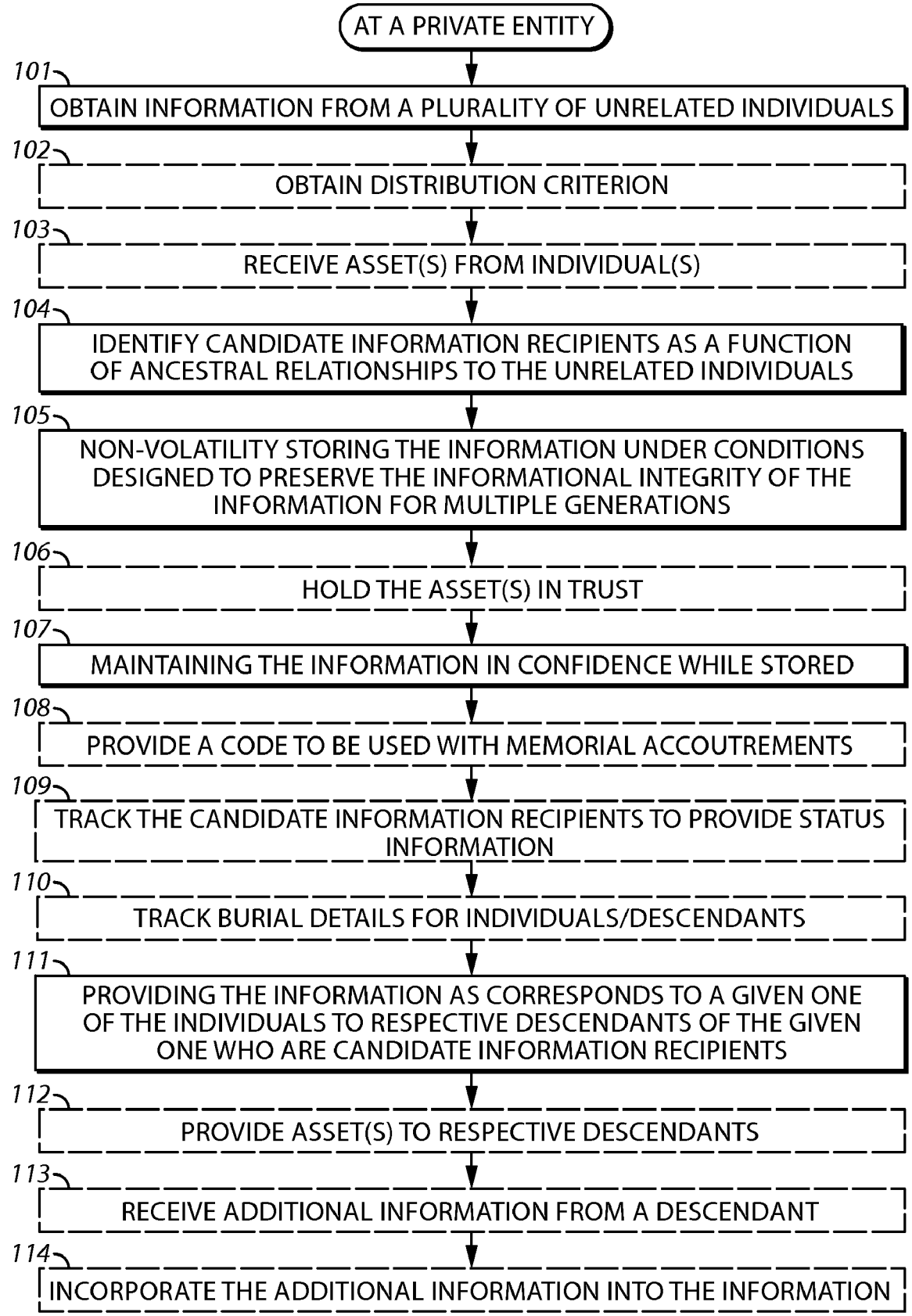

METHOD OF FACILITATE OBTAINING, STORING, AND SUBSEQUENTLY CONVEYING INFORMATION BETWEEN RELATED GENERATIONS

TECHNICAL FIELD

This invention relates generally to storing and conveying information.

BACKGROUND

Families and familial relationships comprise an important, likely critical, component of humankind. Though reputedly sometimes abused and occasionally harsh or dysfunctional, for the most part family relationships are and remain one of the primary core building blocks of civilized existence. In addition to providing a mechanism to facilitate the safe and proper raising of children, family relationships also serve as a way to pass content from one generation to the next. In this regard, a relatively complex area of law provides for the passing of wealth and physical things to one's heirs. In the absence of a will stating otherwise, for example, typical applicable laws usually provide for distributing the estate of a deceased person amongst their family relations.

Historically, family relationships have also served as a mechanism to pass along the knowledge of a parent to a child or grandchild. Such an approach sometimes led to relatively long-lived family-based businesses in various parts of the world regarding the manufacturing or hand-crafting of certain materials or products.

Existing behaviors in these regards, however, leaves much to be desired. In many cases, a given individual will find that their greatest asset comprises information. Information regarding what to do, and what not to do, in various situations, for example. Information that reflects, in some cases, a lifetime's worth of experience, experiment, and observation. For the most part, estate planning laws and practices are designed to distribute wealth and things. When the "thing" comprises, for example, a notebook containing such information, that notebook can be readily bequeathed to a particular recipient. This approach, however, typically offers only a relatively short-term solution. The fate and use of that notebook many generations removed becomes quite suspect and unreliable given present practices.

Similarly, the personal handing down of wisdom, experience, and advice from one generation to the next is only as reliable as the weakest generational link. A poor or uninspiring deliverer of such information and/or an uncaring, uninterested recipient can contribute to a complete loss or distortion of such information. There are also individuals who harbor a concern that their personal story will be subject to intentional or unintentional revisionist alterations at a time when they will be unable to correct misunderstandings. Again, the accuracy of a given narrative is more likely to change with retellings from one generation to another than not.

By one approach, a given individual can commit such information to a book, an Internet resource, or other public mechanism to ensure that such information is not lost in such ways. This, however, requires releasing such information to a public forum. At worst, persons outside one's family may use such information while those within the family ignore it, all to the possible eventual harm of the family in a competitive world.

A genuine problem exists, therefore, with respect to providing one's wisdom, experience, and advice to future generations in a manner that tends to preserve both the sanctity of that information and its confidentiality or limited dissemination. Present solutions offer a look-and-feel of value in this regard, but are in fact greatly lacking in substantive effect.

BRIEF DESCRIPTION OF THE DRAWING

The above needs are at least partially met through provision of the a method to facilitate obtaining, storing, and subsequently conveying information between related generations described in the following detailed description, particularly when studied in conjunction with the drawing, wherein FIG. 1 comprises a flow diagram as configured in accordance with various embodiments of the invention.

Skilled artisans will appreciate that elements in the figure are illustrated for simplicity and clarity. For example, common but well-understood elements that are useful or necessary in a commercially feasible embodiment may not be depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a party (such as a private entity) obtains information from a plurality of unrelated individuals. This party then identifies candidate information recipients as a function of ancestral relationships to the unrelated individuals and also provides for non-volatily storing the information under conditions designed to preserve the informational integrity of the information for multiple generations. These teachings also provide for maintaining such information in confidence. This entity then provides the information as corresponds to a given one of the plurality of unrelated individuals to respective descendants of the given one who are candidate information recipients. So configured, successive generations of descendants will have sequential access to the information as corresponds to their respective ancestors while the information remains unrevealed to others.

Those skilled in the art will recognize and appreciate that these teachings achieve numerous goals and desires of various persons while simultaneously avoiding or minimizing many of the problems that have plagued prior art solutions in this space. While these teachings are able to accommodate the handling of things (such as assets of various kinds), these teachings are primarily directed at the handling of information in a manner that tightly coincides with a given individual's intent and wishes. By these teachings a given individual can gain a concrete assurance that their wisdom, advice, and experience will be rendered tangibly available to future familial generations while remaining substantially unavailable to non-familial members in the absence of some express authorization, action, or the like.

These and other benefits may become clearer upon making a thorough review and study of the following detailed description. Referring now to the drawings, and in particular to FIG. 1, an illustrative process as accords with these teachings and as may be practiced by a corresponding private entity will be described. (This private entity may comprise either a for-profit enterprise or a not-for-profit enterprise and those skilled in the art will understand and recognize that as used herein, "private" refers to either a privately held or a publicly held and traded enterprise.)

Pursuant to this process 100, the private entity facilitates the obtainment 101 of information from each of a plurality of unrelated individuals; i.e., individuals who are not specifically related to one another in a familial manner by blood and/or by marriage or other consecrated or legally recognized union. To put it more bluntly, the private entity holds this process 100 open to the general public (though possibly with eligibility requirements pertaining to criteria of interest such as demonstrated skills, experience, success, or the like). This step places the described process 100 at odds with a large portion of the prior art in that this process 100 eschews the typical approach where a given family develops only for itself a process to at least attempt to convey information from one generation to another.

Such information can comprise a wide range of content including, but not limited to, instructions, wishes, lessons, observations, conclusions, personal and/or family history, notes, a diary or daily journal or the like, directions to secreted family information, valuables, or the like, a family tree or other genealogical information1 (with or without annotations), family pictures (including photographs, paintings, sculptures, and other renderings in physical or virtual form), and so forth. By one approach, this information can be completely determined, in both substance and form, by the individual providing the information. In such a case, this step of obtaining such information can simply comprise receiving whatever information the corresponding individual might choose to provide.

The information obtained can comprise textually-based content (in whatever form including Braille format), audio-only content, audio-visual content, visual-only content, and/or even olfactory-based content as desired by use of appropriate corresponding recording equipment and/or chemical analysis equipment and techniques. The specific media or vehicle used may vary, for example, with the needs, preferences, requirements, and/or opportunities as pertain to a given one of the individuals. It would also be possible to obtain substantively identical content using multiple such approaches. For example, the information might be obtained in both a recorded audio format and a textual format.

These teachings will accommodate obtaining such information using any of a variety of information gathering techniques as are presently known in the art or as may be developed in the future. By one approach, this can simply comprise receiving the information from such an individual in whatever form (and with whatever content) they might wish to employ.

Such information can be obtained, for example, via an interview process. Such an interview can be conducted, in whole or in part, by one or more live interviewers. It would also be possible if desired to use a virtual interviewer (such as, but not limited to, an interactive software-based interviewer that may employ, if desired, artificial intelligence to guide, shape, and inform the interview process). Interviewing techniques in general, including those facilitated through the use of artificial intelligence platforms, are generally known in the art and these teachings are not overly sensitive to the selection of any particular approach in this regard. It is also possible that such an interview can comprise a minimalist approach, as when the sum total of the inquiry provided to the interview is, directly or impliedly, the substantive equivalent of "What information would you like to provide?"

By another approach, the individual can be provided with one or more guides or instructions to facilitate the gathering and presentation of such information. This might comprise, for example, providing the individual with a questionnaire that is designed to elicit information of value or interest. A single generic questionnaire might be used for this purpose or a variety of more specific questionnaires could be developed and used. For example, one questionnaire could be designed expressly to elicit a family history from the interviewee while another questionnaire could contain questions more expressly designed to extract useful information regarding the starting and/or operating of a business, and so forth. It would also be possible to pose hypothetical questions to the interviewee. The answers to such questions might then serve to define, articulate, and/or illustrate and exemplify such things as the values, ethics, morals, or viewpoints of the individual in question.

Such a questionnaire can assume any of a variety of forms. This can include, for example, a written questionnaire provided in hardcopy (as a book, pamphlet, or the like) or in a virtual form (such as an on-line-based document or the like). It would also be possible to administer such a questionnaire through one or more interrogators. Such interrogators could give voice to the questions and possibly also serve, if desired, to interpret, explain, or amplify upon the question posed as appropriate.

It would also be possible to obtain such information using a diary-style information entry look-and-feel form factor. This may comprise either a hardcopy approach (using a hardcopy diary, log, journal, or the like) or a soft or virtual approach as when the entries are obtained via, for example, a virtual diary, an on-line data entry service, or even via an email-styled approach. As to the latter, it would be possible, for example, to permit the individual to send emails, when and as they saw fit, to an email address that correlated to a person or platform that served to collect such offerings as the obtained information mentioned above.

Whether through the use of a questionnaire approach, a diary-style approach, or some other approach, this step of obtaining information can also comprise, if desired, substantively organizing the information for at least one of the individuals. This can comprise, for example, organizing the information by topic areas. To illustrate, the submissions by a given individual might be parsed into corresponding substantive categories such as family life, business practices, charitable practices, love, and education (presuming for the sake of example that these are the primary categories to which this individual's information are found to relate).

It would also be possible for such information obtainment to further comprise editing the information with respect to matters of form. This could relate, for example, to spelling corrections, grammar corrections, and so forth. This could also include translating the information from an original language into one or more other languages of choice (as may be useful when the individual believes, hopes, or expects that one or more of their descendants will likely speak such other language).

Such information can be so obtained via a single corresponding information-gathering event if desired. By one approach, this single information-gathering event can comprise a single interview opportunity or can, if desired, comprise a plurality of temporally discrete sub-events (as when the gathering of the information takes place, say, over an initial two week period or the like). By another approach, however, such information can be obtained with less restriction in this regard. For example, these teachings will accommodate obtaining such information from a given individual on a more or less random or unscheduled basis over an indefinite period of time if so desired.

As will be explained in more detail, if desired, this process 100 will also accommodate obtaining one or more corresponding trigger criteria. Such trigger criterion can relate, tightly or loosely, to one or more items of the obtained information. Such trigger criteria can be obtained at the time of obtaining the information or can be obtained at some other time of convenience or need.

As alluded to above, and as will be explained below in more detail, the aforementioned information has been obtained in order to eventually facilitate its distribution to one or more descendants of the given individual. With that in mind, this process 100 will therefore optionally accommodate, if desired, also obtaining 102 distribution criterion from the individual as may supplement whatever standard or optional practices may otherwise be offered or available with respect to this process 100. For example, a given individual may wish to condition the distribution of some or all of their proffered information upon such things as:

- an age of a given one of the respective descendants of such an individual;
- an educational attainment of the given one of the respective descendants;
- an academic achievement of the given one of the respective descendants;
- a business achievement of the given one of the respective descendants;
- matrimonial status of the given one of the respective descendants;
- health of the given one of the respective descendants;
- a religious achievement of the given one of the respective descendants;
- illegal behavior by the given one of the respective descendants; or
- an addiction of the given one of the respective descendants;
- gender of the given one of the respective descendants;
- an order of birth of the given one of the respective descendants;
- a demonstrative level of maturity of the given one of the respective descendants;
- net worth of the given one of the respective descendants; and/or
- an occurrence of a particular specified event (such as particular event in the world at large, or sequence of events, or the like).

to note but a few examples in this regard (where those skilled in the art will recognize and understand that these examples are intended to serve an illustrative purpose only and are not intended to comprise an exhaustive listing of all possibilities in this regard). These criteria can be as general, or as specific, as a given individual may wish to provide.

The foregoing steps relate to information. If desired, however, this process 100 will also accommodate receiving 103 one or more assets from such an individual. Such assets can comprise things of great intrinsic value, things of sentimental value, things of education or exemplary value, and so forth. By one approach this asset can comprise the wherewithal to permit a given descendant to take a particular action urged by the individual in their information.

This process 100 then provides for identifying 104 candidate information recipients as a function of ancestral relationships to the unrelated individuals. This, in turn, will serve to identify individuals in the future who will be entitled to share the aforementioned information. By one approach, for example, this can comprise identifying candidate information recipients by one or more specific genetic identifiers (such as, but not limited to, deoxyribonucleic acid (DNA) information). This can comprise, for example, requiring at least a predetermined degree of matching with respect to the genetic characteristic of choice. By such an approach, candidate information recipients can be identified by having a particular genetic closeness to a corresponding individual. If desired, the specified degree of matching can be set to vary over time. To illustrate, some dilution would be expected over the course of, say, one thousand years and a corresponding looser degree of correlation might be permitted to account for such a circumstance.

Another approach, either in lieu of the above approach or in combination therewith, can comprise identifying candidate information recipients by marriage. Again, if desired, a degree of closeness can be specified to limit information dissemination to only relatives having greater than a particular nexus by marriage. And again, such a degree of closeness can be varied over time if desired to account for the diluting effects of time.

It would also be possible to consider other kinds of ancestral conditions. For example, some individuals might wish to limit the ability to access their information to only every other generation of direct descendants and/or to only descendants of a particular gender.

This process 100 then provides for non-volatily storing 105 the information under conditions designed to preserve the informational integrity of the information for multiple generations. Those skilled in the art will recognize that the expression "non-volatily" refers to a storage context that is not unduly tenuous; i.e., a memory that will not lose its contents when exposed to a relatively ordinary and expected operating event is often characterized as being non-volatile memory. The precise nature of such storage can vary and will almost certainly vary over time as technologies change. At present, this might comprise storing hardcopy versions of the information in a location that is secure with respect to various threats such as fire, water, unauthorized access, insects, humidity, and so forth. This might also comprise, at present, the use of one or more electromagnetic data storage facilities or optical data storage facilities as are presently known in the art. Other forms of data retention could also be used as desired including applying scrivened content on a non-volatile medium. For example, one could employ lasers to inscribe the information in textual form on stone, non-corroding metal surfaces, and so forth.

It is anticipated that such storage practices will typically include examining alternative storage opportunities from time to time and, upon determining that a storage practice is now available that is better than a presently used storage practice that is being used to non-volatily store the information, acquiring and using that storage practice for these purposes. The periodicity by which such an examination occurs can vary or can occur on a scheduled basis as desired. In general, however, with the overall passage of time it is expected that this will comprise repeatedly accessing then-presently available storage practices in this regard.

Regardless of the particular storage medium used, if desired, this step of storing the information can further comprise using redundant storage facilities. By one approach, for example, this can comprise using storage facilities that share at least some of the same information and that are located substantially geographically distal to one another. This precise distance can vary with the needs and requirements of a given application setting. As one illustrative example in this regard, when seeking to position redundant assets in locations that will tend to assure survival of at least one of the storage assets upon the occurrence of a single massive civilly-catastrophic event, it may be prudent to place such assets many thousands of miles from one another. Another related approach would be to place redundant assets on differing continents or to place at least one such facility in orbit around the Earth, the Earth's moon, or elsewhere in space.

In some cases, it may also be desirable to place at least some of the information in a location that is at least substantially exempt from regulation by a single sovereignty. This might comprise, for example, storing such information in a ship or a substantially stationary platform (such as a submerged, floating, or above water platform such as the so-called micronation of Sealand) that remains in international waters. An airborne or even a space borne, off-Earth location may also serve in this regard.

Generally speaking, this step of storing the information contemplates exactly that. If desired, however, this step can also encompass other information husbanding actions such as deleting particular items of information in response, for example, to a triggering event having occurred. For example, a given individual can provide one or more trigger criteria and, when a corresponding event occurs, this step can comprise modifying the information in some particular way (for example, by deleting the information in whole or in part). Various trigger criteria can serve in this regard. Some illustrative examples include, but are not limited to, a particular date, a particular specific event, and/or a particular kind of event (such as, but not limited to, a particular level of performance as may be achieved by a recipient descendant).

As noted above, this process 100 will accommodate receiving one or more assets 103 from such unrelated individuals. Accordingly, just as this process 100 provides for storage 105 of receiving information this process 100 can also optionally provide for holding 106 such assets in trust. This can comprise using traditional available storage facilities (such as bank safe deposit boxes or the like) or can comprise using private storage facilities that are operated under the control and as per the dictates of the aforementioned private entity as desired. Again, and depending upon the fragility of the assets themselves, such storage can be designed to preserve and protect such assets against the depredations of time and damaging agents such as heat, humidity, moisture, theft, and so forth.

This process 100 also provides for maintaining 107 the information in confidence while storing that information. There are various means of facilitating such a step. This can certainly comprise providing security to prevent (or at least discourage) unauthorized individuals from gaining access to such information. This security can comprise barriers, guards, locks, surveillance, intrusion detectors, alarms, and so forth. This step can also comprise a careful vetting of all persons who are permitted access to such information for whatever reason. This can include the establishment of appropriate contracts regarding the applicable terms, conditions, and behaviors as shall attend such access as well as interviews, background checks, and so forth. This step can also comprise, if desired, the use of encryption to encrypt the information. By one approach, the encryption key (or keys) can be stored separately from the encrypted information itself and afforded an even greater level of security if desired. As one example in this regard, the encryption key can comprise, or can be based upon or be derived from, a particular family heirloom of choice.

As alluded to earlier, this process 100 is intended to eventually serve as a way of facilitating dissemination of such information to corresponding vetted descendants. As will be shown below, this process 100 can therefore further accommodate tracking such potential recipients in order to effectuate such a purpose. It is possible, however, that circumstances may occlude or distort one's view in this regard. In such a case, it is possible that an otherwise qualified potential recipient will be lost to this process.

To help in this regard, if desired, these teachings will accommodate providing 108 a code to one or more of the aforementioned unrelated individuals. This code can comprise, for example, a visual code (such as a word, symbol, or the like, and where it will be understood that as used herein, a "visual code" can comprise a code that is visible under ordinary viewing conditions or that is only visible given special viewing conditions (such as special lighting, a particular amount of magnification, or the like)), an audible code, or even executable code if desired. Such a code can then be included with a given individual's memorial accoutrements (such as, for example, a headstone, a mausoleum, a casket, a funerary urn, an obituary, or the like) to identify that individual as having information stored as described herein. This, in turn, may assist with directing a lost descendant of that individual to the private entity and thereby possibly becoming eligible to access the information. By one approach, such a code can be publicized in a manner intended to educate the general public regarding such a meaning.

In any event, these teachings will also accommodate, if desired, tracking 108 candidate information recipients to thereby provide corresponding status information. Such status information can comprise information regarding births, deaths, and marriages, for example. Such information can also comprise any other information as would relate, directly or indirectly, to one or more of the aforementioned distribution criteria as may have been selected by a given individual. For example, status information regarding such things as college degrees, gained or lost employment, illnesses, and so forth could be monitored and noted. Such tracking can be overt and with the knowledge and even acquiescence or assistance of those being tracked and/or can be covert and transparent to the persons being tracked as desired. Such status information can then be used, for example, to facilitate providing information to given descendants by confirming, for example, their existence and eligibility and/or the satisfaction of one or more distribution criteria as may apply in their particular case.

In a somewhat similar manner, these teachings will also ready accommodate tracking other information, such as burial details for one or more of the individuals and/or their respective descendants 110. Such information is often lost with the passage of time and such information may be viewed by at least some persons as a useful or even valuable point of information.

In any event, this process 100 then serves to provide 111 the information as corresponds to various ones of the unrelated individuals to their respective descendants. To be clear on this point, the information as corresponds to a first such individual can be provided to the descendants of that particular first individual but not to others and particularly not to the general public. Similarly, the information as corresponds to a second such individual can be provided to the descendants of that particular second individual but not to others and particularly not to the general public (including but not limited to the descendants of that first individual).

This does not mean, of course, that a given future person might not be eligible to receive information as was originally provided by two unrelated individuals. Such a circumstance could arise, for example, when a given future individual is a blood descendant of a first such unrelated individual and a relation by marriage to a second such unrelated individual.

By one approach, this provision of information occurs via a series of steps. This might include, for example, contacting the recipient, educating the recipient regarding the process, and providing the recipient with access to the information. By another approach, this provision of information might comprise an automatic provision of information. In such a case, the information could be automatically forwarded to the authorized recipient using a conveyance medium of choice or convenience.

These teachings will accommodate a variety of ways to accomplish such a step. By one approach, for example, the information can be provided to the corresponding descendant in a substantially original form. By another approach, some or all of the information can be used to form a curriculum, which curriculum is then delivered to the corresponding descendant (s). This might be done using a live academic setting if desired, where one or more live instructors present the material (perhaps over some series of classes). In a somewhat similar manner this information might be provided using a virtual academic setting. An individual who provides the information in the first instance may make decisions in this regard, at the time of initially providing the information as described above, based upon their feelings regarding how best the information might be conveyed.

By one approach, some or all of such information is delivered via some review or instructional modality but the recipient is not permitted to take a copy of the information with them. In such a case, if desired, the recipient might be allowed to re-access the information on whatever schedule may be deemed appropriate in order to permit the recipient to effectively have subsequent access to the information. In the alternative, some or all of the conveyed information can be provided to the recipient in some usable physical form such that the recipient is able to re-access such information at their own convenience.

As noted earlier, these teachings will accommodate receiving and holding one or more assets as were provided by the unrelated individuals. In such a case, this process 100 will also then accommodate providing 112 at least a portion of those assets to eligible descendants. If desired, providing such assets can be based, at least in part, upon assessing the performance of a recipient of the information with respect, for example, to an instruction, challenge, or the like as may be contained, directly or indirectly, in that information. This can even comprise a series of events where a given descendant performs a series of accomplishments as may be specifically or impliedly set forth in the information and receives, in turn, a series of corresponding allocations from the aforementioned assets.

As noted, this process 100 can serve to facilitate the availability of information from one generation to another over any number of subsequent generations. By one approach, each subsequent generation can, if they wish, initiate such a process from their own vantage point. If desired, however, it would also be possible to permit future generations to make their own additions to such information as originated with a particular individual. Such additional information could comprise supplemental information or could comprise a kind of annotation or footnote to the already existing information. In such a case this process 100 could then further comprise receiving 113 such additional information from an eligible descendant and incorporating 114 that additional information into the information itself. By one approach, however, the original information can remain in an inviolate form, thereby always rendering it available along with whatever additional content may have been added over the years.

By such an approach the information as provided by an original individual can be supplemented, explained, or otherwise expanded upon by future generations. This, in turn, can provide a powerful mechanism by which such information can comprise a living, breathing collection of information rather than eventually losing relevance and becoming an anachronism rather than an aid.

If desired, one or more of these steps can be conditioned upon the offering of consideration from one or more of the participating parties. For example, by one approach, all of the described steps might be accommodated by a single upfront payment that effectively serves to endow the legacy of their provided information. In the alternative, piecemeal payments can be offered at various stages of the process as desired. Accordingly, an initial fee can be assessed to facilitate obtaining the information with yet another fee incrementally assessed, if desired, to place that information into some appropriate form (to facilitate its storage, its eventual dissemination to a descendant, and so forth). In such a case, additional fees might be due and payable, perhaps from time to time, to support the aforementioned storage of that information and/or the provision of that information to a given descendant. Numerous other possibilities are of course available in this regard as well.

These teachings provide an easily scaled and highly leveragable construct whereby knowledge of various kinds can become a proprietary driver over time for corresponding families. Just as things are sometimes handed down from generation to generation, these teachings provide a way by which wisdom and hard-earned insights can be passed to one's descendants in a private and confidential manner.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one example in this regard, if desired, such a process can be optionally modified to permit receiving permission to render public at least a portion of the aforementioned information and to then facilitate at least a limited publication of such information. As another example in this regard, the information for a given individual, which information has been extended, added to, and/or otherwise annotated over the years can be organized in various ways to facilitate searching by, for example, a particular author, contributor, or subject, a particular generation, century, decade, or year, and/or topic or result. This could include, for example, an appropriately configured and populated database, an index, and so forth. This might also include, if desired, a layer-based approach that permits a viewer to selectively remove subsequent contributions on a given basis (such as with respect to a particular time frame, or contributor, or the like).

I claim:
1. A method comprising:
obtaining information from a plurality of unrelated individuals;
automatically, by a computer, determining candidate information recipients as a function of ancestral relationships to the unrelated individuals;
non-volatily storing the information under conditions designed to preserve the informational integrity of the information for multiple generations;
maintaining the information in confidence while storing the information;

providing the information as corresponds to a given one of the plurality of unrelated individuals to respective descendants of the given one who are candidate information recipients;

such that successive generations of the descendants have sequential access to the information as corresponds to their respective ancestors while the information remains unrevealed to others.

2. The method of claim 1 wherein obtaining information from a plurality of unrelated individuals comprises obtaining the information via an interview process conducted with at least one of the unrelated individuals.

3. The method of claim 2 wherein obtaining the information via an interview process conducted with at least one of the unrelated individuals further comprises conducting a live interview.

4. The method of claim 2 wherein obtaining the information via an interview process conducted with at least one of the unrelated individuals further comprises conducting an interview with the at least one of the unrelated individuals using a virtual interviewer.

5. The method of claim 4 wherein the virtual interviewer comprises, at least in part, an interactive software-based interviewer.

6. The method of claim 5 wherein the interactive software-based interviewer comprises an artificial intelligence-based platform.

7. The method of claim 4 wherein the virtual interviewer comprises, at least in part, a hard-copy-based interview format.

8. The method of claim 1 wherein obtaining information from a plurality of unrelated individuals comprises substantively organizing the information for at least one of the plurality of unrelated individuals.

9. The method of claim 8 wherein substantively organizing the information comprises organizing the information by topic areas.

10. The method of claim 8 wherein substantively organizing the information comprises editing the information with respect to matters of form.

11. The method of claim 1 wherein obtaining information from a plurality of unrelated individuals comprises obtaining at least one of:
 textually-based content;
 audio-only content;
 audio-visual content;
 visual-only content;
 olfactory-based content.

12. The method of claim 11 wherein obtaining information from a plurality of unrelated individuals comprises obtaining the information using at least one of:
 a questionnaire;
 a visual recording media;
 an audio recording media;
 chemical analysis.

13. The method of claim 1 wherein obtaining information from a plurality of unrelated individuals comprises obtaining the information for each of the individuals via a single corresponding information-gathering event.

14. The method of claim 13 wherein the single information-gathering event comprises a plurality of temporally discrete sub-events.

15. The method of claim 1 wherein obtaining information from a plurality of unrelated individuals comprises adding information to already received information for a given one of the plurality of unrelated individuals.

16. The method of claim 15 wherein adding information to already received information for a given one of the plurality of unrelated individuals further comprises adding the information using a diary-style information entry look-and-feel form factor.

17. The method of claim 15 wherein adding information to already received information for a given one of the plurality of unrelated individuals further comprises receiving the information from a descendant of the given one of the plurality of unrelated individuals.

18. The method of claim 1 wherein determining candidate information recipients as a function of ancestral relationships to the unrelated individuals comprises identifying at least one specific genetic identifier.

19. The method of claim 18 wherein the at least one specific genetic identifier comprises at least a predetermined degree of matching with respect to a particular genetic characteristic.

20. The method of claim 19 wherein the particular genetic characteristic comprises, at least in part, deoxyribonucleic acid information.

21. The method of claim 1 wherein determining candidate information recipients as a function of ancestral relationships to the unrelated individuals comprises identifying a permitted range of ancestral relationship by marriage.

22. The method of claim 1 wherein determining candidate information recipients as a function of ancestral relationships to the unrelated individuals comprises identifying descendant relationships to be denied being provided the information.

23. The method of claim 22 wherein the descendant relationships comprise alternating generations.

24. The method of claim 1 further comprising:
 obtaining from at least one of the plurality of unrelated individuals at least one additional criterion to be met by a given one of the respective descendants before providing the information as corresponds to the at least one of the plurality of unrelated individuals to the given one of the respective descendants.

25. The method of claim 24 wherein the at least one additional criterion comprises a criterion as regards:
 an age of the given one of the respective descendants;
 an educational attainment of the given one of the respective descendants;
 an academic achievement of the given one of the respective descendants;
 a business achievement of the given one of the respective descendants;
 matrimonial status of the given one of the respective descendants;
 health of the given one of the respective descendants;
 illegal behavior by the given one of the respective descendants;
 an addiction of the given one of the respective descendants;
 gender of the given one of the respective descendants;
 an order of birth of the given one of the respective descendants;
 a demonstrative level of maturity of the given one of the respective descendants;
 net worth of the given one of the respective descendants;
 an occurrence of a particular specified event.

26. The method of claim 1 wherein non-volatily storing the information under conditions designed to preserve the informational integrity of the information for multiple generations comprises at least one of:
 storing the information using electromagnetic data storage facilities;
 storing the information using optical data storage facilities;

storing the information using scrivened content on a non-volatile medium.

27. The method of claim 1 wherein non-volatily storing the information under conditions designed to preserve the informational integrity of the information for multiple generations comprises storing the information using redundant storage facilities.

28. The method of claim 27 wherein the redundant storage facilities are located substantially geographically distal to one another.

29. The method of claim 27 wherein at least one of the redundant storage facilities is co-resident with an emergency shelter that is designed to provide relatively long term survival opportunities for at least one person with respect to civilly-catastrophic events.

30. The method of claim 1 wherein non-volatily storing the information under conditions designed to preserve the informational integrity of the information for multiple generations comprises physically storing the information in a location that is substantially exempt from regulation by a single sovereignty.

31. The method of claim 30 wherein the location comprises a ship in international waters.

32. The method of claim 30 wherein the location comprises a substantially stationary platform in international waters.

33. The method of claim 30 wherein the location comprises a platform that is at least one of:
  submerged;
  floating;
  above water;
  airborne;
  space borne.

34. The method of claim 30 wherein non-volatily storing the information under conditions designed to preserve the informational integrity of the information for multiple generations comprises storing the information in a micronation.

35. The method of claim 1 wherein non-volatily storing the information under conditions designed to preserve the informational integrity of the information for multiple generations comprises:
  determining that a storage practice is now available that is better than a presently used storage practice that is being used to non-volatily store the information;
  using the storage practice that is now available to non-volatily store the information.

36. The method of claim 35 wherein determining that a storage practice is now available comprises repeatedly assessing presently available storage practices.

37. The method of claim 1 wherein providing the information as corresponds to a given one of the plurality of unrelated individuals to respective descendants of the given one who are candidate information recipients comprises providing the information in a substantially original form.

38. The method of claim 1 wherein providing the information as corresponds to a given one of the plurality of unrelated individuals to respective descendants of the given one who are candidate information recipients comprises automatically providing the information as corresponds to a given one of the plurality of unrelated individuals to respective descendants of the given one who are candidate information recipients.

39. The method of claim 1 wherein providing the information as corresponds to a given one of the plurality of unrelated individuals to respective descendants of the given one who are candidate information recipients comprises using the information to form a curriculum and delivering the curriculum to the respective descendants.

40. The method of claim 39 wherein delivering the curriculum comprises delivering the curriculum in a live academic setting.

41. The method of claim 39 wherein delivering the curriculum comprises delivering the curriculum using a virtual academic setting.

42. The method of claim 1 further comprising:
  receiving assets from at least one of the plurality of unrelated individuals;
  holding the assets in trust;
  providing at least a portion of the assets to the respective descendants in conjunction with providing the information as corresponds to a given one of the plurality of unrelated individuals to the respective descendants.

43. The method of claim 42 further comprising:
  assessing performance of the respective descendant with respect to at least some portion of the information as is given to the respective descendant;
  providing at least a further portion of the assets to the respective descendants as a function, at least in part, of the performance.

44. The method of claim 1 further comprising:
  receiving additional information from a given one of the respective descendants;
  incorporating the additional information into the information as was stored for provision to the given one of the respective descendants.

45. The method of claim 1 further comprising:
  tracking the candidate information recipients to provide status information;
  using the status information to facilitate providing the information as corresponds to a given one of the plurality of unrelated individuals to respective descendants of the given one who are candidate information recipients.

46. The method of claim 1 further comprising:
  receiving permission to render public at least a portion of the information as corresponds to a given one of the plurality of unrelated individuals;
  facilitating at least a limited publication of the at least a portion of the information.

47. The method of claim 46 further comprising:
  receiving consideration in return for publishing the at least a portion of the information.

48. The method of claim 1 wherein:
  obtaining information from a plurality of unrelated individuals further comprises receiving, for at least one such item of information, a corresponding trigger criterion; and
  non-volatily storing the information further comprises modifying the at least one such item of information in response to an occurrence of the trigger criterion.

49. The method of claim 48 wherein the trigger criterion comprises at least one of:
  a particular date;
  a particular specific event;
  a particular kind of event.

50. The method of claim 48 wherein receiving, for at least one such item of information, a corresponding trigger criterion comprises receiving, for the at least one such item of information, a plurality of corresponding trigger criteria.

51. The method of claim 48 wherein modifying comprises deleting.

52. The method of claim 1 further comprising:
  receiving at least some consideration upon non-volatily storing the information.

53. The method of claim 1 wherein providing the information as corresponds to a given one of the plurality of unrelated individuals to respective descendants of the given one who are candidate information recipients further comprises offering to provide the information as corresponds to a given one of the plurality of unrelated individuals to respective descendants of the given one who are candidate information recipients provided consideration is received substantially contemporaneous with providing the information.

54. The method of claim 1 further comprising:
tracking burial details for at least some of the individuals and their respective descendants.

55. The method of claim 54 further comprising:
including at least a portion of the burial details with the information.

56. The method of claim 1 further comprising:
providing to at least one of the plurality of unrelated individuals a code, which code can be provided in conjunction with the individual's memorial accoutrements to identify the individual as having the information stored as described and available for provision to at least certain of their descendants.

57. The method of claim 56 wherein the code comprises at least one of:
a visual code;
an audible code;
an executable code.

58. The method of claim 56 wherein the memorial accoutrements include at least one of:
a headstone;
a mausoleum;
a casket;
a funerary urn
an obituary.

* * * * *